United States Patent

[11] 3,623,018

[72] Inventors James R. Evans
Endicott;
John W. Roossien, Binghamton, both of N.Y.

[21] Appl. No. 875,610
[22] Filed Nov. 12, 1969
[45] Patented Nov. 23, 1971
[73] Assignee International Business Machines Corporation
Armonk, N.Y.

[54] MECHANISM FOR SEARCHING FOR SELECTED RECORDS IN RANDOM ACCESS STORAGE DEVICES OF A DATA PROCESSING SYSTEM
5 Claims, 3 Drawing Figs.

[52] U.S. Cl. .......... 340/172.5
[51] Int. Cl. .......... G11b 13/00
[50] Field of Search .......... 340/172.5

[56] References Cited

UNITED STATES PATENTS 3,295,102 12/1966 Neilson .......... 340/172.5 X
3,312,948 4/1967 Capozzi .......... 340/172.5
3,332,069 7/1967 Joseph et al. .......... 340/172.5
3,448,436 6/1969 Machol .......... 340/172.5

*Primary Examiner*—Raulfe B. Zache
*Assistant Examiner*—R. F. Chapuran
*Attorneys*—Hanifin and Jancin and John C. Black

ABSTRACT: A mechanism is disclosed for making complex record searches in random access storage devices. A plurality of parameter values, for example, the department number, age, years of service, are each compared in succession with upper and lower limit parameter values. The parameter values are found in each record by the use of a beginning address of the byte in the record at which the parameter value begins and by a byte count value which is equal to the number of bytes required to define the parameter. A plurality of logical operators associated with each parameter define combinations of parameter tests which must be met in order to satisfy the search criteria.

| TAG | PARAMETER | PARAMETER TABLE ENTRIES | | | | | | |
|---|---|---|---|---|---|---|---|---|
| | | LOWER LIMIT | UPPER LIMIT | BEGIN ADDR | BYTE COUNT | LOGICAL OP B1 | B2 | B3 |
| A | DEPARTMENT NO. | 316 | 316 | 14 | 3 | 1 | 0 | 0 |
| B | AGE | 35 | 25 | 56 | 2 | 0 | 1 | 0 |
| C | YEARS SERVICE | 5 | 5 | 65 | 1 | 1 | 0 | 0 |

*INVENTORS*

JAMES R. EVANS

JOHN W. ROOSSIEN

BY John C Black

*ATTORNEY*

MECHANISM FOR SEARCHING FOR SELECTED RECORDS IN RANDOM ACCESS STORAGE DEVICES OF A DATA PROCESSING SYSTEM

BACKGROUND OF THE INVENTION

The improved mechanism of the present application relates to random access storage devices, for example, those generally of the type supplied with System 360 processing systems manufactured by International Business Machines and identified as 2302 Disk Storage Device, 2311 Disk Storage Device, the 3021 Data Cell with a 2321 Data Cell Drive, and a 2303 Drum Storage Device. These random access storage devices are coupled to the CPU (central processing unit) of a System 360 by means of a 2841 Storage Control Unit. The data format and portions of the control circuitry are illustrated in U.S. Pat. No. 3,299,410 issued Jan. 17, 1969 to J. R. Evans. U.S. Pat. No. 3,348,213 issued Oct. 17, 1967 to J. R. Evans describes a modification of the above-described random access devices and their storage control units by teaching the use of an addressable core matrix buffer in the storage control unit for minimizing the time required to access records from the random access storage devices and to minimize the amount of CPU time that must be utilized to select such records.

SUMMARY OF THE INVENTION

The ability to search a file of data and select desired data from that file has been incorporated in commercially available random access devices but with very limited capabilities. More comprehensive search capabilities will be required in the future if customer demands are to be satisfied. These search capabilities should range from the simple facilities that are currently provided to a more complex variety that permits searches to be conducted on noncontiguous fields within specified limits. It is an object of the present invention to provide a search mechanism that will meet these criteria without significantly adding to the cost of the overall equipment.

In accordance with the present invention, the initiation of a complex search will result in the transfer from the central processing unit to the storage control unit of a parameter table having a plurality of table entries. Each table entry will specify upper and lower limits which are the values of the search argument, the beginning address of the field to be searched for the parameter, the number of bytes in the field to be searched, and a logical operator to be used for determining whether or not search criteria are met. The logical operators represent and/or functions to permit the search criteria to require various combinations of tests to be met. For example, the logical operators might require that the first, third and fifth parameters be met or the logical operators might require that only the second parameter test be met or the fourth parameter test. In this manner, various combinations of parameters may be specified for satisfying the overall search criteria.

When a search is initiated, the parameter table is transferred to an addressable buffer memory in the storage control unit. Registers are provided in the storage control unit for storing the lower limit and the upper limit of a parameter search argument value. Another register is provided for storing the address of the buffer memory in the storage control unit which will be accessed to store the first byte of the parameter.

In the typical search according to the preferred embodiment, a plurality of records will be read from a selected random access storage device in sequence and as each record is read it is transferred to a dedicated section of an addressable buffer storage in the storage control unit. If the search criteria is met the record is transferred to the main storage device via the CPU.

Each parameter test is made by a compare circuit concurrent with the reading of the corresponding parameter value of a record from the random access storage device. If a parameter value meets the test, a latch corresponding to the particular parameter is set. When all parameter values in a record have been tested and their corresponding latches set or not set depending upon the test results, the logical operator values are used in a series of logic tests to sample various combinations of the latch outputs to determine whether or not the search criteria is satisfied. If the logic tests indicate satisfaction of the search criteria, the record is transferred from the control unit buffer to main store via the CPU.

DESCRIPTION OF THE PREFERRED EMBODIMENT

Figures 1, 2:
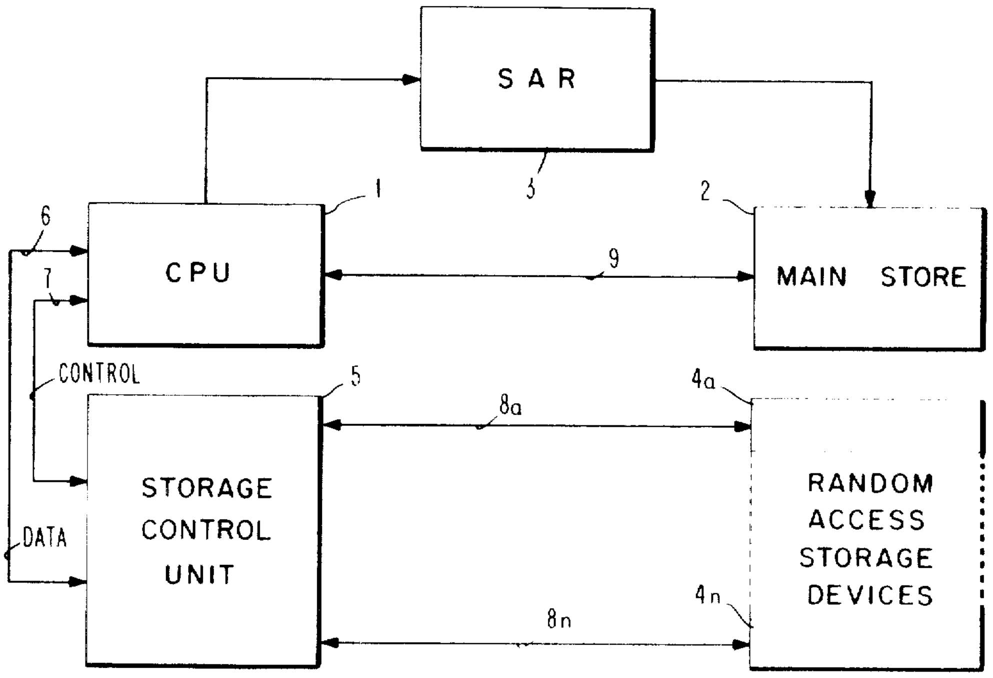
FIG. 1 illustrates diagrammatically a data processing system of the type within which the present improvement may be used to advantage.
FIG. 2 illustrates a parameter table identifying typical search criteria which may be used in the present improvement.

FIG. 1 shows a well-known processing system comprising a CPU 1, a main store 2, and a storage address register 3, controlled by the CPU for entering data into and removing data from the main store 2.

Primary source data for the system is received from conventional input/output devices, some of which are illustrated in FIG. 1; i.e., random access devices 4a–4n, inclusive. The transfer of data between the main store unit 2 and the devices 4a–4n for effective processing of data is in many commercial installations effected by the CPU 1; however, the preferred embodiment of the present improvement utilizes a storage control unit 5 in conjunction with the CPU 1 to effect data transfers. The unit 5 may be any one of many well-known units but preferably it is generally of the type identified above, i.e., a 2841 Storage Control Unit.

Briefly, the unit 5 receives data from and transmits data to devices 4a to 4n serial by bit over lines 8a–8n, respectively. The unit 5 receives data from and transmits data to the CPU 1 serial by byte e.g., eight bits plus a parity bit) via cable 6. Data is transmitted between the CPU 1 and main store 2 via cable 9. Control of data transfers between the CPU 1 and the devices 4a–4n via control unit 5 is effected by control circuits in both the CPU 1 and the control unit 5 interconnected by control or tag lines of cable 7 in a well-known manner.

For purposes of the detailed description, it will be assumed that the device 4a is a magnetic disk storage device and that record data is recorded thereon in a known manner with a plurality of fields separated by gaps. Only one field, the data or message field, will be transferred to the CPU 1; all other fields being used for control.

FIG. 2 illustrates an example of a parameter table including three entries identified by tags A, B and C. The entry identified by the tag A relates to the parameter "employee department number;" and the search criteria indicated by the lower and upper limits values "316" indicate that only employees from department "316" meet the search criteria. The numeral 14 appears in the beginning address column of the entry A and this indicates that the department number begins with the fourteenth byte of information in the message field of each record being searched. The numeral 3 appears in the byte count column associated with entry A, and this indicates that the department numbers in the records being searched are three bytes long; e.g., one decimal digit per byte. It will be appreciated, however, that in many instances data will be stored in a more efficient arrangement such as binary or packed decimal wherein two decimal digits are stored in one byte of data in a record field.

In the three logical operator columns B1, B2 and B3 of entry A, there are three binary digits "100." The three columns B1, B2 and B3 indicate that three sequential tests will be made to determine whether or not various parameters or combinations of parameters have been met. Note that the second entry B includes in its logical operator column values "010" and entry C includes the binary values "100." These sets of logical operators are effective, after all of the parameters for one record have been checked against their upper and lower limits, to make a series of logical tests on the results of the parameter tests. The first logical test is that identified by the logical operators of all table entries in the column B1. A binary "1" value in entries A and C of column B1 indicate that both parameter tests for entry A and entry C must be met in order to satisfy the search function. However, since entry B in column B1 includes a binary "0" value, this indicates that the parameter test for entry B need not be met for the first test. Hence, after all the parameters have been checked against their upper and lower limits for one record, the first test will be made for column B1 to determine whether or not the person identified in the record works in department number "316" and has at least 5 years of service.

Assume that the first logical operation to check the results for the table entries does not satisfy the search function. In this instance, a second test will be made in accordance with the logical operator values in the column B2. Since the only entry in the column B2 having a binary "1" logical operator value is table entry B, a logical test will be made to determine whether or not the results of the parameter test indicate that the individual identified by the record is between "25" and "35" years of age.

Since the logical operator values of all entries in column B3 are binary "0" values, no test will be made for this column. Hence, only two logical tests are made with logical operator values for the example shown in FIG. 2, i.e., the test identified by column B1 and that identified by column B2.

Figure 3:
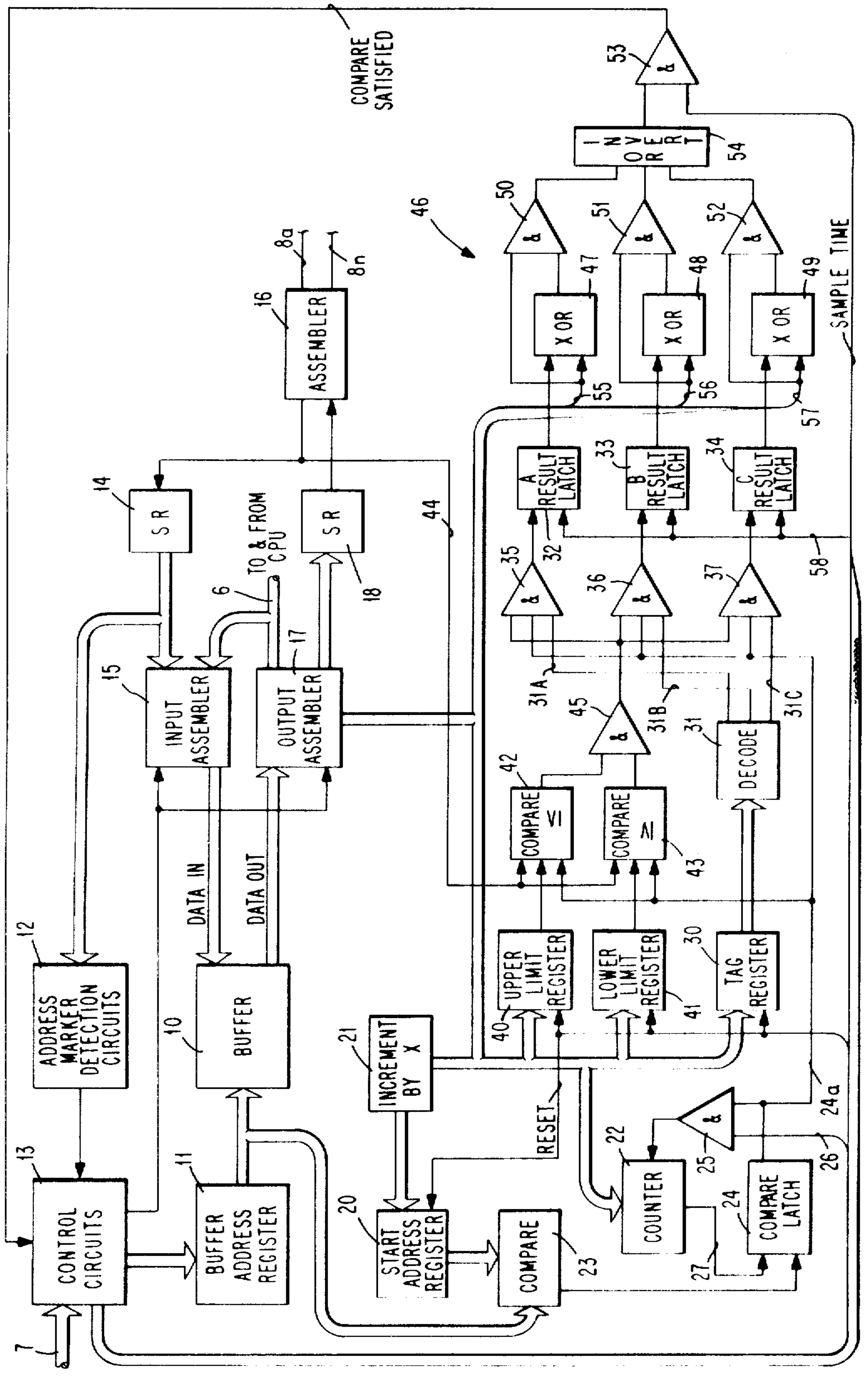
FIG. 3 is a fragmentary schematic diagram illustrating one preferred means for effecting the improved search technique.

FIG. 3 illustrates only so much of the circuitry incorporated within the storage control unit 5 as is required to explain a preferred form of the present improvement. Thus, the control unit 5 includes an addressable buffer 10 which by way of example may be a conventional core storage device having a suitable buffer address register 11. It will be assumed for purposes of the present application that one predetermined area in the buffer 10 is dedicated to storing the message field of each record as it is read from one of the random access devices preparatory to being transferred to the main store 2 by way of the CPU 1. It is further assumed that another preselected area of the buffer 10 is dedicated to storing succeeding entries of the parameter table when a search is to be made in accordance with the teachings of the present invention. Access to various storage positions of the buffer 10 is made in a well-known manner by means of the buffer address register circuits 11 and control circuits 13.

Data from the disk 4*a* is received serial by bit over the line 8*a* and is applied to a shift register 14 by way of an assembler 16. The shift register 14 applies the data to the buffer 10 serial by byte. Data is transferred from the buffer to the disk 4*a* via an assembler 17, shift register 18 and assembler 16.

Each record in a group of related records is preceded by an address marker which identifies the beginning of the record. An address marker detection circuit 12, upon detection of a marker, indicates to the control circuits 13 the beginning of a new record being read from a random access storage device. The control circuits 13 select the location in the buffer 10 which is the first storage position for a record message field to be stored.

The storage control unit 5 also includes a start address register 20 which is utilized to store an address value of the buffer 10 which corresponds to the position in the buffer 10 in which the first byte of a parameter to be tested will be stored. This value is determined in part by the parameter table beginning address for a particular entry, for example, the beginning address of entry A of the table illustrated in FIG. 2 is 14. This value 14 is read from the buffer 10 prior to the parameter test and is incremented in a circuit 21 by some value X, which is equal to the address of the first position in the buffer 10 for storing the record message field as described above.

The storage control unit 5 also includes a counter 22. The byte count value of each entry in the parameter table is read from the buffer 10 into the counter 22 preceding the comparison of the parameter value of that entry against the upper and lower limits defined in the table entries. Thus, the byte count value "3" for entry A in the parameter table of FIG. 2 is entered into the counter 22 prior to comparison of the department number value for a record against the upper and lower limits "316" defined in the table. Subsequently, the byte count values for table entries B and C are each entered into the counter 22 before their respective parameters are read from the random access storage device into the buffer 10 and compared against the upper and lower limits identified in the table.

The counter 22 has associated therewith decrementing circuit means (not shown) which is rendered effective when a compare circuit 23 obtains an equal compare between the address in the start address register 20 and the buffer address register 11, which indicates that the first byte of a parameter to be checked is being entered into the buffer 10. The equal compare output from the circuit 23 sets a compare latch 24 which prepares an AND circuit 25 for decrementing the counter 22. As each byte of the parameter is entered into the buffer 10 the control circuits 13 will apply a pulse to the increment byte line 26 causing the AND circuit 25 to decrement the counter by a value of one. The value in the counter 22 will reach zero when all of the bytes of the parameter have been entered into the buffer 10 and at this time the counter 22 applies a signal to the reset line 27 to reset the compare latch 24.

The storage control unit 5 also includes a tag register 30 into which is read the tag value corresponding to the parameter entry table when a particular parameter is to be checked against its upper and lower limits. The tag register 30 is coupled to a decode circuit 31, the output of which selects one of a plurality of result latches 32, 33 or 34 by way of AND circuits 35, 36 and 37, respectively. The latches 32, 33 and 34 are utilized to store the results of each parameter comparison with its upper and lower limits. Thus, the latch 32 is set to a logical value "1" if table entry A of FIG. 2 is satisfied when a record is transferred from a random access storage device to the buffer 10 and, in fact, the department number of the individual identified by the record works in department 316. Similarly, for the same record, latches 33 and 34 will be set to their logical "1" values in the event that the age set forth in the record is between 25 and 35 and if the years of service set forth are equal to five.

An upper limit register 40 and a lower limit register 41 are provided for storing the upper and lower limit values of the parameter table entries as the particular parameters are being transferred from the random access storage device to the buffer 10. The outputs of the registers 40 and 41 are applied to a pair of conventional compare circuits 42 and 43 of the type which compare the value of a register with binary bits received serially bit by bit.

Data is read serially bit by bit from the random access storage device 4*a* and transferred serially by byte into the buffer 10 by way of a shift register 14 and an input assembler 15; and at the same time the data is applied serially bit by bit to the compare circuits 42 and 43 by way of a line 44. The compare circuits 42 and 43 are rendered effective to make the comparison between the incoming data and stored upper and lower limit values in the registers 40, 41 only when the compare latch 24 is set to produce a signal on line 24*a* indicating that the particular parameter values are being read from the random access storage device to the buffer. If both the upper and lower limit value tests are satisfied, the compare circuits 42 and 43 produce outputs which are applied to an AND circuit 45; and the output of the AND circuit is supplied to the AND circuits 35, 36 and 37, one of which has already been conditioned by the decode circuit 31 and the compare latch 24 to cause the conditioned AND circuit to set its respective latch 32–34 to the logical "1" state.

The outputs of the result latches 32–34 are connected to the logical operator test circuits 46. The circuit 46 includes a plurality of exclusive OR circuits 47, 48 and 49, one for each of the parameters to be checked.

The outputs of the latches 32–34 are applied to respective inputs of the circuits 47–49. Logical operators are applied from the buffer 10 to the circuits 47–49 by way of the assembler 17 and logical operator lines 55–57.

The outputs of the exclusive OR circuits are coupled to AND circuits 50, 51 and 52. Additional inputs to the AND circuits 50, 51 and 52 are provided by logical operator lines 55, 56 and 57. The outputs of the AND circuits 50–52 are coupled to an AND circuit 53 by way of an OR invert circuit 54. The output of the AND circuit 53 is returned to the control circuits 13.

After all of the parameters in a record have been tested against their upper and lower limit values and the results of these tests have been stored in the latches 32–34, the control circuits 13 cause the logical operator values in the columns B1, then B2, then B3, to be read out in sequence and applied to lines 55, 56 and 57, which are inputs to the exclusive OR circuits 47–49 and AND circuits 50–52. Each time that a set of logical operator values is applied to the exclusive OR circuits 47–49 and the AND circuits 50–52, the AND circuit 53 will produce an output in the event that the particular logical operator test has been satisfied. A signal applied by AND circuit 53 to control circuits 13 initiates a transfer of the record from the buffer 10 to the CPU 1 via the assembler 17 and cable 6. In the event that the logical operator test has not been satisfied, no change in the output level will be produced at the output of the AND circuit 53.

A description of the detailed operation of the preferred implementation of FIG. 3 will now be made. Let it be assumed that the CPU 1, under control of its problem program, has initiated a search of records on the disk 4a using the three table entries A, B and C of FIG. 2. These table entries together with their tags A, B, C are transferred from the main store unit 2 to the buffer 10 by way of the CPU, the cable 6 and the input assembler 15 in a known manner.

Once the table entries have been so transferred, the control circuits 13 are conditioned in the usual manner to initiate a search in a predetermined group of records on the disk 4a. At the same time, an initialization process is effected by the control circuits 13 to transfer (1) the lower and upper limit values "316" of table entry A from the buffer 10 to the registers 41 and 40, respectively, (2) the beginning address "14" of table entry A (incremented by the value X) from the buffer 10 to the start address register 20, (3) the byte count "3" of the table entry A from the buffer 10 to the counter 22, and finally the tag value "A" from the buffer 10 to the tag register 30.

The decode circuit 31 responds to the value in the tag register 30 to condition the AND circuit 35. The control circuits 13 cause the buffer address register 11 to be set to the address which corresponds to the position in the buffer 10 for storing the first byte of the record to be read. The circuits of FIG. 3 are now conditioned to receive and test the first record to be read from the disk 4a.

Subsequent to this initialization process and to the selection of a first record in said group, the circuits 12 will detect an address marker preceding the record message field and indicating the transfer of a new record. As the record is read from the disk 4a, only the message field is transferred into the buffer 10, all other information in the record being stripped therefrom in a well-known manner.

When the first byte of the message field is received by the shift register 14, the control circuits 13 will cause this byte to be entered into the buffer 10 at the position corresponding to the address in the register 11. The control circuits 13 then increment the register 11 to the address of the position in the buffer 10 for storing the next succeeding byte of the message field. When the first byte of data is transferred from the disk 4a to the shift register 14, it is also applied to circuits 42, 43 via line 44; however, the compare circuits 42 and 43 are ineffective since the compare latch 24 is in its reset state.

Succeeding bytes of the message field are transferred from the selected disk 4a to succeeding byte positions of the buffer 10; and the address register 11 is incremented as each byte is transferred. After 13 bytes have been transferred to the buffer 10, the address register 11 will have been incremented to a value equal to that stored in the start address register 20. The compare circuit 23 produces an "equal" output signal which sets the compare latch 24. The latch 24 applies a signal to its output line 24a to condition the compare circuits 42 and 43 and to further condition the AND circuit 35 so that the latter circuit is prepared to sample the output of the compare circuits 42 and 43. The compare circuit 24 also conditions the AND circuit 25 for decrementing the counter 22 as each succeeding byte of the message field is transferred into the buffer 10.

As each bit of the next (14th) byte in the message field of the record is received by the assembler 16 via line 8a, it applies the bit to the compare circuits 42 and 43 by way of the line 44. In a known manner the compare circuits 42 and 43 compare succeeding bits on line 44 with corresponding bits stored in the upper and lower limit registers 40 and 41 to determine whether the value of the bits received over the line 44 are equal or less than the upper limit value in register 40 and greater than or equal to the lower limit value in the register 41. As soon as the compare circuit test in circuits 42 or 43 is met, the corresponding circuit applies an output to the AND circuit 45. If both tests are satisfied, AND circuit 45 applies an input signal to the AND circuit 35 to set the A result latch 32.

More specifically, the circuit 42 compares the first bit (which is the highest order bit) received over line 44 with the high order bit stored in the register 40. If this first bit on line 44 is less than the corresponding bit in the register 40, the compare search function is satisfied and the compare circuit 42 produces an output signal. If this first bit is greater than the high order bit in the register 40, it is clear that the test is not satisfied. If, however, the two high order bits are equal, the decision is inconclusive; and tests must be made on succeeding bits to determine whether the parameter test is satisfied.

Similarly, the first bit applied to line 44 is compared by the circuit 43 with the high order bit in the register 41, and if the value of the bit on the line 44 is greater than the high order bit in the register 41, the test is satisfied. If the value of the bit on line 44 is less than the high order bit in the register 41, the parameter test cannot be satisfied. If the two values are equal, tests on subsequent lower order bits must be made until it is determined that the parameter test is met or not. An equal compare between the lowest order bit of the received data and the value in register 40 or 41 represents satisfaction of the test argument.

As each of the three bytes of the department number data is transferred from the random access storage device to the buffer 10 concurrent with the operation of the compare circuits 42, 43, the address register 11 is incremented and the counter 22 is decremented via the line 26 and the AND circuit 25. The original value in the counter 22 was three and therefore the counter will have been decremented to zero after three bytes have been transferred. When the counter 22 is decremented to zero, it resets the compare latch 24 via an output line 27. This causes the compare circuit 24 to prevent further decrementing in the counter 22, renders the compare circuits 42 and 43 ineffective, and removes its conditioning signal from the AND circuit 35. A pulse on the RESET line resets registers 20, 30, 40 and 41.

The circuits in FIG. 3 are now ready for a second initialization process during which the parameter table values of entry B (FIG. 2) will be transferred from the buffer 10 to the start address register 20, the upper and lower limit registers 40 and 41, the counter 22 and the tag register 30 in a manner generally similar to that described above with respect to the transfer of table entry A values.

The next sequence of events are generally similar to that described above with respect to table entry A and will not be described in detail. Briefly, however, transfer of the message field to the buffer 10 continues; and, when the 56th byte of the message field is ready to be transferred from the random access storage device to the buffer 10, the compare circuit 23 sets the latch 24 which conditions compare circuits 42 and 43 and the AND circuit 36 which has been previously preconditioned by the value in the tag register 30 and the decode circuit 31.

As the 56th and 57th byte in the message field are transferred to the buffer 10, the compare circuits 42 and 43 will determine whether or not they meet the parameter test in table entry B; i.e., the age value is less than or equal to 35 and greater than or equal to 25. If the test is satisfied, the circuits 42 and 43 cause outputs to be applied to the AND circuit 45 which, in turn, causes the AND circuit 36 to set the B result latch 33.

A third initialization process is then effected to transfer the parameter values of entry C from the buffer 10 to the start address register 20, the counter 22, the upper and lower limit registers 40 and 41 and the tag register 30. When the 65th byte in the message field is transferred to the buffer 10, the compare circuits 42 and 43 determine whether or not this byte meets the parameter test of entry C (equal to 5 years of service) and if the test is satisfied, the compare circuits 43 apply signals to the AND circuit 45 which, in turn, causes the AND circuit 37 to set the result latch 34.

The transfer of data from the disk 4a to the buffer 10 continues and the circuits of FIG. 3 are now ready for initiating the logical operator tests.

Attention is now directed to the logical circuit 46 for determining whether or not the search criteria identified by the logical operators is satisfied by the record being transferred from disk file 4a to the buffer 10. Logical "0" inputs normally exist on lines 55, 56 and 57. After all parameter tests have been completed to cause setting of those latches 32, 33, 34 in which the tests have been satisfied, the leftmost column (B1) of logical operator bits "101" of the parameter table are read from the buffer 10 causing logical "1" signals to be applied to the inputs 55 and 57 of exclusive OR circuits 47 and 49 via assembler 17; and a logical "0" signal remains applied to the input 56 of exclusive OR circuit 48.

It will be assumed that the search arguments for table entries A and C have been satisfied and, therefore, latches 32 and 34 apply logical "1" input signals to the other inputs of exclusive OR circuits 47 and 49. With logical "1" signals applied to both inputs of exclusive OR circuit 47, its output will be at the logical "0" level. Hence, its associated AND circuit 50 will produce a logical "0" output signal.

Similarly, the AND circuit 52 associated with exclusive OR circuit 49 will produce a logical "0" output signal. Since the logical operator bit for the table entry B is zero, and since it forms one of the inputs of the AND circuit 51, the output of the AND circuit 51 will be at the logical "0" level. Consequently, the output of the OR invert circuit 54 will be at the logical "1" level.

When a logical "1" pulse is applied to the AND circuit 53 via the line SAMPLE TIME, a short time after the logical operators are applied to lines 55–57, the output of circuit 53 goes to the logical "1 " level because the output of the OR invert circuit 54 is at the logical "1" level.

The output of the AND circuit 53 is identified as the COMPARE SATISFIED line; therefore, a logical "1" on this line at the time when the sample pulse is applied indicates that the search function in column B0 of the logical operator set has been satisfied. Thus, the record being read into buffer 10 satisfies the search criteria. When the complete record has been transferred from the disk 4a to the buffer 10, it is then transferred from the allocated section of buffer 10 to an appropriate area of the main store 2 for further processing in accordance with the program. The allocated section of the buffer 10 is then ready to receive another record, assuming that it is desired to find all records in a selected group which meet the parameter table criteria.

Let us assume that the search arguments of table entries A and C were not satisfied as assumed above, but rather that the search argument for the entry B was satisfied. In this instance, the circuit 46 will cause a logical "0" output (i.e., no change in level) from the AND circuit 53. For example, if the search argument of entry A is not satisfied, the latch 32 applies a logical "O" input to its respective exclusive OR circuit 47. On the other hand, the first logical operator bit for the table entry A is a logical "1" and this is applied to the input 55 of the exclusive OR circuit 47 and to one input to the AND circuit 50.

Since the exclusive OR circuit 47 has logical "1" and "0" inputs applied, its output will be at the logical "1" level causing the output of the AND circuit 50 to be at the logical "1" level. The OR invert circuit 54 produces a logical "0" output, preventing a change in the output of AND circuit 53 when the sample time pulse is applied.

After sample time, the next succeeding logical operator bits "010" (column 82) of table entries A, B and C are then applied to the logical operator inputs 55–57 of the circuit 46. Since the logical operator bits for table entries A and C are zero, the outputs of the AND circuits 50 and 52 are necessarily zero. If the search function for the table entry B is satisfied, logical "1" bits will be applied to both inputs of exclusive OR circuit 48, whereby the output of the AND circuit 51 will be at the logical "0" level. With logical zeros at all inputs thereto, the OR invert circuit 54 produces a logical "1" output. When the next sample time pulse is applied, the circuit 53 produces a logical "1" output signal indicating that the record has satisfied the search function.

After the logical operator tests are completed, a pulse on line 58 resets the latches 32–34.

Although in the preferred embodiment the parameter table is set up for binary searches, the arrangement is still compatible with the use of synonym handling. If synonyms are used, the upper and lower limits are equal, for example, as in table entry A. However, the upper and lower limit registers 40, 41 and the compare circuits 42, 43 must be duplicated (one for each synonym) so as to accept synonym equivalents.

While the invention has been particularly shown and described with reference to a preferred embodiment thereof, it will be understood by those skilled in the art that suggested changes in form and details may be made therein without departing from the spirit and scope of the invention.

What is claimed is:

1. In apparatus of the type in which a central processing unit is operated in accordance with a stored program, in which a random access storage device has data records stored in a plurality of storage locations therein and in which a control unit is provided for transferring records between the storage device and the processing unit in accordance with instructions in the program, the combination therewith of means to search for records transferred from the random access storage device, portions of which records satisfy one or more search argument combinations, comprising a first means in the control unit for storing parameter table data entries, each entry including an identifying tag, upper and lower limit parameter search argument values, a beginning address value corresponding to the beginning address of the parameter in each record being searched, data corresponding to the length of the parameter field and logical operator bits corresponding to tests to be applied to record parameters being searched to determine whether or not they satisfy at least one of a predetermined number of selected search argument combinations, means in the control unit for comparing each parameter value of a transferred record with its corresponding stored upper and lower limit parameter search argument values, means in the control unit controlled in accordance with the tags for storing the results of each parameter value comparison, means in the control unit controlled by the logical operator values for making a sequence of tests on the stored results to determine whether or not selected search argument combinations have been satisfied, and means for effecting transfer of a record in the central processing unit when it satisfies at least one of the selected search argument combinations.

2. The apparatus set forth in claim 1 wherein an addressable buffer storage device having a buffer address register is provided in the control unit for receiving the records read from the random access device and for storing the records in an allocated section thereof until said sequence of tests is performed on the stored results of the parameter value comparisons.

3. The apparatus set forth in claim 2 together with additional means controlled in accordance with the buffer address register values, the beginning address values and the parameter length data for rendering the comparing means effective only while parameter values are being read from the random access storage device.

4. The apparatus set forth in claim 3 wherein said additional means comprises a start address register, means for entering into the start address register values corresponding to the addresses of the buffer positions at which the first byte of each parameter is stored, means responsive to the values in the buffer address register and in the start address register for rendering the comparing means effective when each parameter is transferred from the random access storage device to the buffer, a decrementing counter for receiving the data corresponding to the parameter field length, means decrementing the counter as each byte of a parameter is transferred from the random access storage device to the buffer, and means including the counter for rendering the comparing means ineffective after each parameter has been transferred to the buffer.

5. In apparatus of the type in which a random access storage device has data records stored in a plurality of storage locations therein and in which means are provided for transferring records between the storage device and an output unit the combination therewith of means to search for records transferred from the random access storage device portions of which satisfy a plurality of search arguments, comprising a first means for storing parameter table data entries, each entry including an identifying tag, upper and lower limit parameter search argument values, a beginning address value corresponding to the beginning address of the parameter in each record being searched, data corresponding to the length of the parameter field and logical operator bits corresponding to tests to be applied to record parameters being searched to determine whether or not they satisfy at least one of a predetermined number of selected search argument combinations, means for comparing each parameter value of a transferred record with its corresponding stored upper and lower limit parameter search argument values, means controlled in accordance with the tags for storing the results of each parameter value comparison, means controlled by the logical operator values for making a sequence of tests on the stored results to determine whether or not selected search argument combinations have been satisfied, and means for effecting transfer of a record to the output unit only when it satisfies at least one of the selected search argument combinations.

* * * * *